Figure 2:
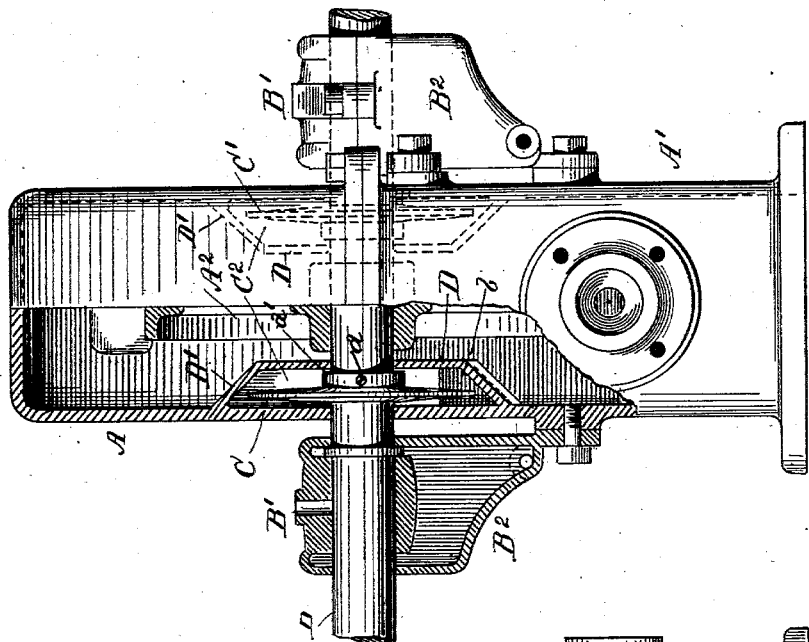

No. 633,962. Patented Sept. 26, 1899.
W. J. KRASE.
WATER WHEEL CASING.
(Application filed Oct. 5, 1898.)

(No Model.)

Witnesses

Inventor.
William J. Krase

UNITED STATES PATENT OFFICE.

WILLIAM J. KRASE, OF SAN FRANCISCO, CALIFORNIA, ASSIGNOR TO THE PELTON WATER WHEEL COMPANY, OF SAME PLACE.

WATER-WHEEL CASING.

SPECIFICATION forming part of Letters Patent No. 633,962, dated September 26, 1899.

Application filed October 5, 1898. Serial No. 692,733. (No model.)

*To all whom it may concern:*

Be it known that I, WILLIAM J. KRASE, a citizen of the United States, residing at San Francisco, in the county of San Francisco and State of California, have invented certain new and useful Improvements in Water-Wheel Casings; and I do hereby declare that the following is a full, clear, and exact description thereof.

This invention relates to certain new and useful improvements in casings for water-wheels driven by the power or force of an impelling jet of water directed against the buckets secured to the periphery of a water-wheel mounted upon a shaft working in the casing; and it consists in the arrangement of parts and details of construction, as will be hereinafter fully set forth in the drawings and described and pointed out in the specification.

In this class of machinery the power-shaft, which passes or extends through the casing and has mounted thereon the water-wheel, works in bearing-boxes located outside of the casing. Usually a stuffing-box is interposed between the casing and bearing-boxes, so as to make a tight joint, and thus protect the bearings. However, practical operation of the water-wheel has demonstrated the fact that the water splashing upon the shaft within the casing makes its escape along the shaft through the stuffing-box and works into the bearings, thus interfering with proper lubrication thereof and at the same time carrying any dirt which may accumulate upon the shaft outside of the casing into the bearings. This escape of the water from within the casing is a source of annoyance not only for the reasons stated, but also owing to the fact that the surface surrounding the casing is maintained wet by the water trickling thereover.

The object of the present invention is to overcome this objection by providing against the water splashed upon the shaft making its escape from within the casing, thus not only enabling the stuffing-boxes to be dispensed with, but maintaining the bearing-boxes free of water.

In order to fully comprehend my invention, reference must be had to the accompanying sheet of drawings, forming a part of this application, wherein—

Figure 1:
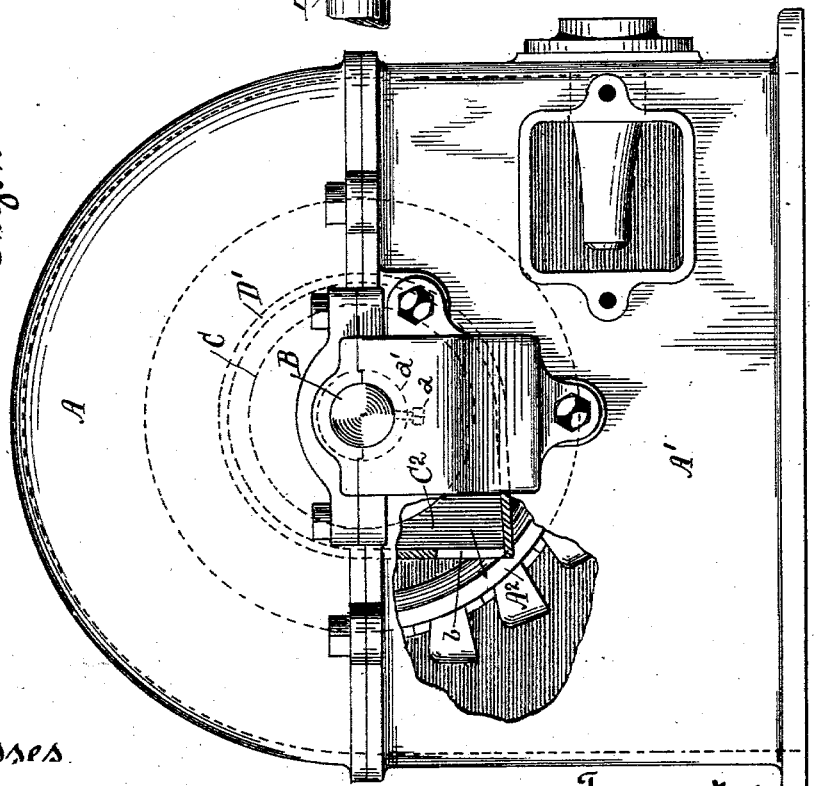

Figure 1 is a side view of the casing, partly broken away; and Fig. 2 is an end view in elevation, partly broken away, viewed from the nozzle end of the casing.

The water-wheel casing is made in the usual manner—that is, in sections A A', which are bolted or otherwise secured together, so as to form a housing within which the water-wheel $A^2$ works. This water-wheel is mounted upon the power-shaft B, which extends through shaft-openings formed in the side walls of the casing and works in bearings B', upheld by brackets $B^2$ outside of the casing. Ordinarily there is interposed between the bearings and side walls of the casing stuffing-boxes in order to form a tight joint. In the present case these stuffing-boxes are dispensed with, and in lieu thereof upon the power-shaft are secured the circular plates or disks C C'. These circular plates or disks are located inside of the casing, preferably, and are arranged upon the power-shaft close to the inner face of the side walls of the said casing, although they do not contact therewith. These circular plates or disks may be formed integral with the shaft, although I prefer to make the same separate therefrom and secure them in place by means of a screw-bolt $a$, passing through collar $a'$, engaging with the shaft, although the same may be keyed or otherwise connected to the shaft. By making the circular plates or disks movable upon the power-shaft the same may be adjusted toward or from each other, as desired, or readily removed or replaced by another in case of either becoming damaged during handling of the power-shaft.

At the inner face of each side plate of the casing is a pocket or chamber $C^2$, within which the circular plates or disks C C' work, said pockets or chambers being formed by annular walls D, united to and held a distance from the side walls of the casing by a web or connecting-flange D', the wall D and connecting web or flange being preferably cast integral with the side walls of the casing. Inasmuch as the casing is made in sections it is apparent that the wall D and web or flange D' are likewise made and arranged so as to properly register as the casing is united, each section of the wall D being centrally cut away so as to surround or embrace the power-shaft. The lower portion of each web or flange D' is run at a downward incline, (shown in Fig. 1 of the drawings,) and an opening $b$ is left at the extremity thereof through which water entering the chamber or pocket $C^2$ may make its escape therefrom into the casing. If desired, the entire bottom of the chamber or pocket may be left open by entirely removing the connecting flange or web at such point, or a series of outlet-openings may be made therein.

During the operation of the water-wheel the water splashed upon the rotating shaft will trickle or run thereon toward the side wall of the casing until brought into contact with the circular plates or disks C C'. As the water travels toward the periphery or outer edge of the plates or disks to pass the obstruction the same will be thrown therefrom by centrifugal force into the pocket or chamber $C^2$ and, running downward, will be discharged from the bottom thereof back into the casing. The water upon the shaft is thus prevented from escaping beyond the disks or plates C C', which act, so to speak, as deflecting-shields for the water. Except for the open bottom the pocket or chamber $C^2$ is entirely closed. Consequently the water cannot splash into said chamber or pocket, and as the walls of the chamber or pocket, including the connecting flange or web, are of circular form the water thrown from the deflecting shields, plates, or disks rapidly moves toward the bottom or discharge portion thereof. The water is thus prevented from accumulating in the pocket or chamber.

I do not wish to be understood as claiming a casing for water-wheels having side or lateral drip-compartments *per se*, for such is well known to me. My invention resides in the use of a shaft having disks or circular plates arranged thereon which rotate within said lateral or side drip-compartments, so as to throw the water into said compartments by centrifugal force. Without the employment of the disks or circular plates the side compartment would be of no use so far as my invention is concerned, as it is only by the use of these disks or plates that the water is thrown off the drive-shaft of the water-wheel. If these disks or circular plates be omitted, the splashed water will follow the shaft to outside of the casing in the same manner as it now follows the shaft and works through the stuffing-boxes.

Having thus described my invention, what I claim as new, and desire to secure protection upon by Letters Patent, is—

1. The combination with a water-wheel casing, of the side chambers or pockets having discharge-openings therein, the power-shaft passing through the casing, and of the disks, plates or water-deflecting shields arranged thereon and working within the side chambers or pockets.

2. The combination with a water-wheel casing, of inwardly-inclined side chambers or pockets thereon having discharge-openings therein, a power-shaft passing through the casing and disks, plates or water-deflecting shields arranged on the shaft within the side chambers or pockets.

In testimony whereof I affix my signature, in presence of two witnesses, this 26th day of September, 1898.

WILLIAM J. KRASE.

Witnesses:
 N. A. ACKER,
 LEE D. CRAIG.